A. HALLNER.
SPRING WHEEL.
APPLICATION FILED MAY 11, 1917.

1,252,689.

Patented Jan. 8, 1918.
2 SHEETS—SHEET 1.

Witness
H. Woodard

Inventor
Andrew Hallner
By H. B. Williams & Co.
Attorneys

A. HALLNER.
SPRING WHEEL.
APPLICATION FILED MAY 11, 1917.
1,252,689.
Patented Jan. 8, 1918.
2 SHEETS—SHEET 2.
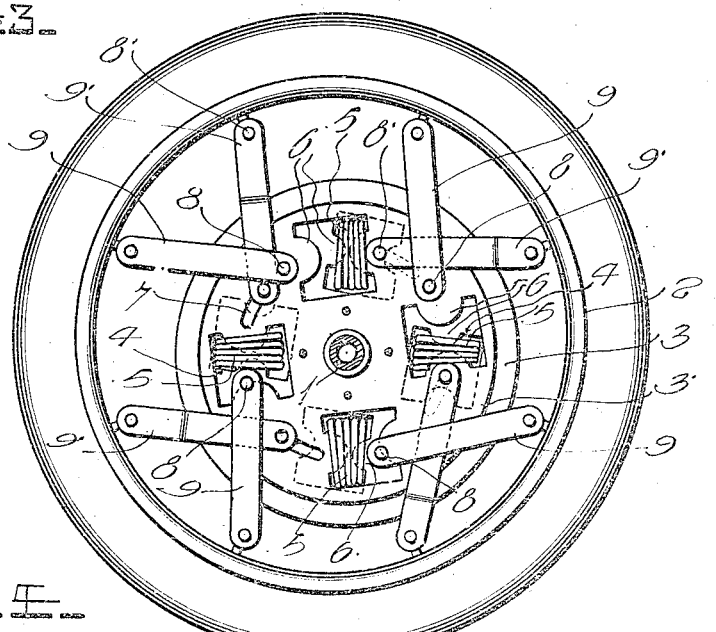
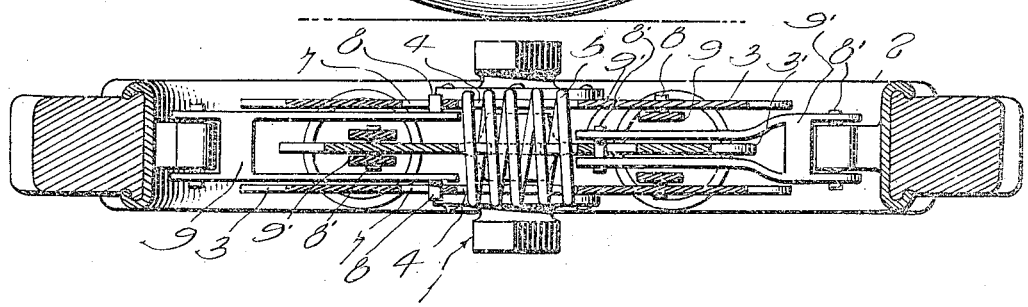
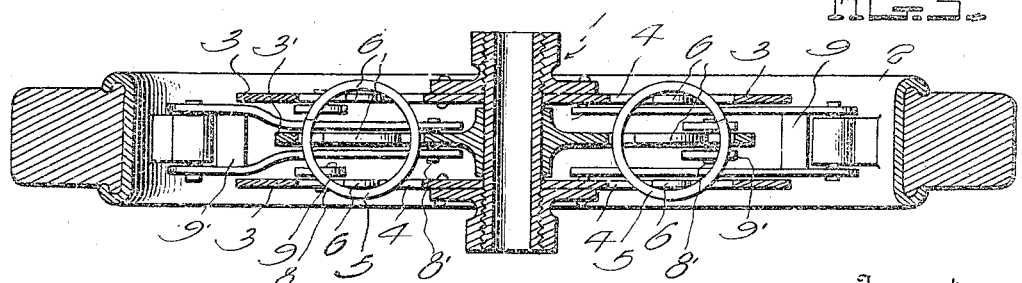
Witness
H. Woodard
Inventor
Andrew Hallner
By H. B. Wilson &co.
Attorneys

UNITED STATES PATENT OFFICE.

ANDREW HALLNER, OF ARBOGA, CALIFORNIA.

SPRING-WHEEL.

1,252,689. Specification of Letters Patent. Patented Jan. 8, 1918.

Application filed May 11, 1917. Serial No. 167,914.

*To all whom it may concern:*

Be it known that I, ANDREW HALLNER, a citizen of the United States, residing at Arboga, in the county of Yuba and State of California, have invented certain new and useful Improvements in Spring-Wheels; and I do declare the following to be a full, clear, and exact description of the invention, such as will enable others skilled in the art to which it appertains to make and use the same.

My invention has for its object to provide a comparatively simple yet a highly efficient wheel so constructed as to permit relative yielding between the rim and hub, the device being applicable for use on vehicles or in place of belt pulleys, in which last application, it will serve to exert a constant tension on the belt to prevent slipping thereof and to compensate for any "whipping" of the shaft. In addition to these uses, the device is applicable for other purposes and I wish it therefore understood that I do not limit my invention to any particular field.

With the foregoing general object in view, the invention resides in certain novel features of construction and unique combinations of parts to be hereinafter fully described and claimed, the descriptive matter being supplemented by the accompanying drawings which constitute a part of this application and in which:

Fig. 3 is a view similar to Fig. 2, illustrating the action of the wheel when relative movement takes place between the hub and rim;

Figure 1:
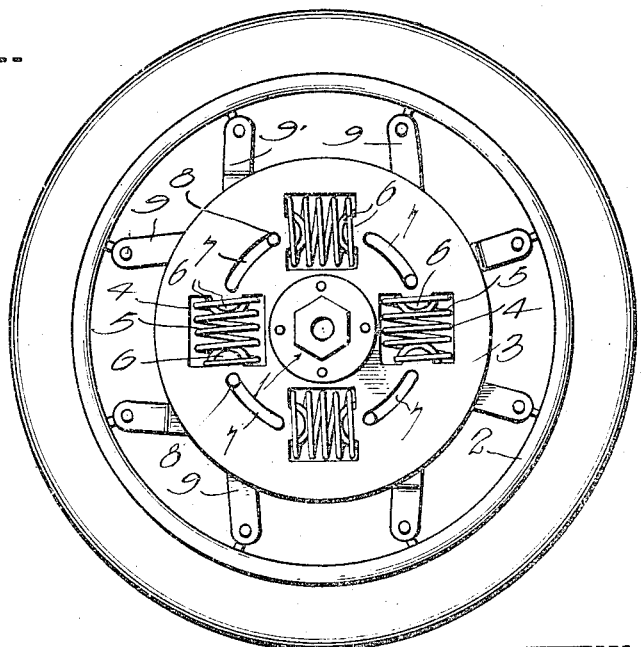
Figure 1 is a side elevation of the improved wheel.
Figure 2:
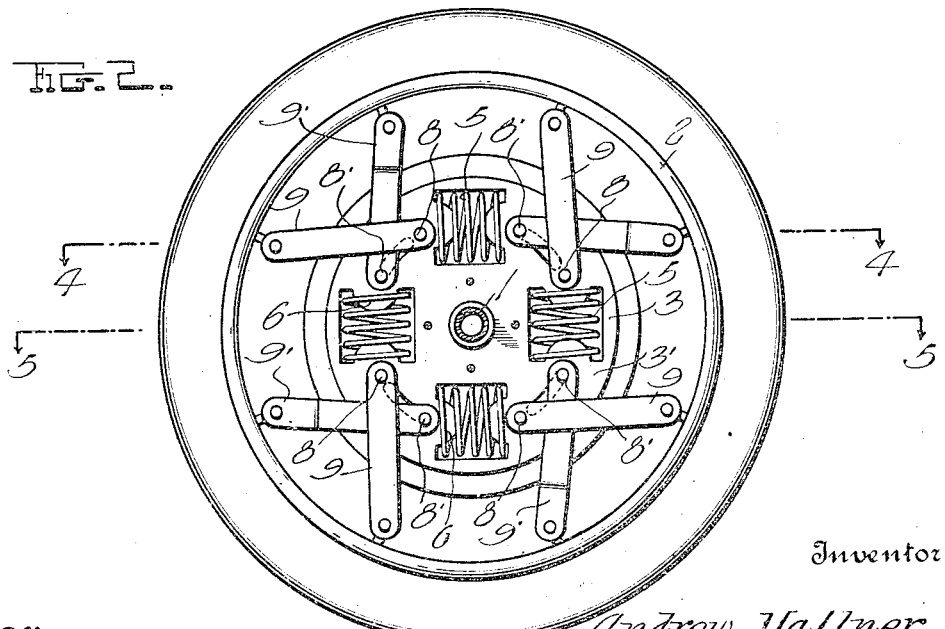
Fig. 2 is a similar view with one of the outermost disks removed, the wheel being shown in its normal position.

Figs. 4 and 5 are sectional views on the planes of the line 4—4 of Fig. 2 and 5—5 of Fig. 2 respectively.

In the drawings above briefly described, the numerals 1 and 2 have reference respectively to the hub and rim of the improved wheel, both of which may be of any preferred or necessary construction, according to the conditions under which the device must operate. A pair of metal disks 3 are shown secured to the hub 1, and positioned on opposite sides of a central disk 3′ which is loosely mounted on said hub. Any suitable number of the disks 3 and 3′ may be employed, but the arrangement illustrated is preferable.

The several disks 3 and 3′ are formed with circumferentially spaced openings 4 which are preferably of rectangular shape, said openings receiving therein coiled cushioning springs 5 and the ends of said openings having lugs 6 extending into the ends of said springs to prevent displacement thereof. The ends of the openings 4 constitute abutments for the disks 3 and 3′, the abutments of the latter being movable with respect to those of the former, against the tension of the springs 5, whenever relative movement of the hub and rim occurs.

Between the openings 4, the disks are formed with circumferentially extending guides preferably in the form of arcuate slots 7, the slots of the disks 3 receiving pins 8 on the furcations of bifurcated inclined links 9 which are pivoted to the rim 2, whereas the slots of the central disk 3′ receive other pins 8′ on oppositely inclining links 9′ which pass between the furcations of the links 9, said links 9′ being also pivoted to the rim 2.

The arrangement of links and slots described causes relative opposite turning movement of the disks 3 and 3′ when the rim is caused to move toward the hub or vice versa, and since such opposite turning action takes place against the tension of the springs 5, the wheel will be extremely resilient. It is therefore well adapted for use on numerous types of vehicles although, as before suggested, the device may be constructed for other purposes. The general arrangement shown and described, however, will in most cases be followed, since probably the best results are obtained thereby, and on account of the advantages of the construction in question, it constitutes the preferred form of the wheel. I wish it understood, however, that within the scope of the invention as claimed, numerous changes may be made without sacrificing the principal advantages.

For instance, although the parts 8 and 8′ are preferably in the form of pins, any other suitable elements could well be employed and the term "pins" in the claims is to be construed accordingly.

I claim:

1. A spring wheel comprising a hub and a rim, a plurality of relatively movable disks mounted at their centers on said hub and having circumferentially spaced abutments, springs interposed between said abutments, and links pivoted to the rim and connected slidably with said disk.

2. A spring wheel comprising a hub and a rim, a plurality of relatively movable disks mounted at their centers on said hub and having circumferentially spaced registering openings, springs in said openings, and links pivoted to the rim and slidably connected to said disks.

3. A spring wheel comprising a hub and a rim, a plurality of relatively movable disks mounted at their centers on said hub and having circumferentially spaced registering openings whose ends are provided with inwardly extending lugs, coiled springs in said openings and receiving said lugs in their ends, and links pivoted to the rim and connected slidably to said disks.

4. A spring wheel comprising a hub and a rim, a plurality of relatively movable disks mounted at their centers on said hub, yielding means for permitting said movement of the disks, and oppositely inclined links pivoted to said rim and having pins at their inner ends, said disks having circumferentially extending guides engaging said pins.

5. A spring wheel comprising a hub and a rim, a plurality of relatively movable disks mounted at their centers on said hub and having circumferentially spaced abutments, said disks also having circumferentially extending guides, cushioning springs interposed between the abutments of said disks, oppositely inclined links pivoted at their outer ends to the rim, and pins on the inner ends of said links slidably engaged with said guides.

6. A spring wheel comprising a hub and a rim, a plurality of relatively movable disks mounted at their centers on said hub, links connecting said disks and said rim for rotatably moving the former relatively upon relative movement of the rim and hub, and spring means independent of said links and operatively associated with said disks for yieldably resisting the movement of the latter.

In testimony whereof I have hereunto set my hand in the presence of two subscribing witnesses.

ANDREW HALLNER.

Witnesses:
JUDITH S. HALLNER,
EDWIN E. LARSSON.

Copies of this patent may be obtained for five cents each, by addressing the "Commissioner of Patents, Washington, D. C."